United States Patent
Jung et al.

(10) Patent No.: US 10,529,967 B2
(45) Date of Patent: Jan. 7, 2020

(54) BATTERY PACK INCLUDING REINFORCEMENT SUPPORTING MEMBER

(71) Applicant: LG CHEM, LTD., Seoul (KR)

(72) Inventors: Jun hee Jung, Daejeon (KR); Min Sung Kim, Daejeon (KR); Yoon Hee Lee, Daejeon (KR); Hak Jun Lee, Daejeon (KR)

(73) Assignee: LG CHEM, LTD., Seoul (KR)

( * ) Notice: Subject to any disclaimer, the term of this patent is extended or adjusted under 35 U.S.C. 154(b) by 97 days.

(21) Appl. No.: 15/750,771

(22) PCT Filed: Sep. 12, 2016

(86) PCT No.: PCT/KR2016/010250
§ 371 (c)(1),
(2) Date: Feb. 6, 2018

(87) PCT Pub. No.: WO2017/078264
PCT Pub. Date: May 11, 2017

(65) Prior Publication Data
US 2019/0157638 A1    May 23, 2019

(30) Foreign Application Priority Data
Nov. 5, 2015  (KR) .................. 10-2015-0154836

(51) Int. Cl.
*H01M 2/10*  (2006.01)
*H01M 10/052*  (2010.01)

(52) U.S. Cl.
CPC ....... *H01M 2/1077* (2013.01); *H01M 2/1094* (2013.01); *H01M 10/052* (2013.01); *H01M 2220/20* (2013.01)

(58) Field of Classification Search
CPC ............. H01M 2/1077; H01M 2/1094; H01M 2/1083; H01M 2/1016; H01M 2/1072;
(Continued)

(56) References Cited

U.S. PATENT DOCUMENTS 4,278,742 A * 7/1981 Oxenreider ........... H01M 2/043
429/175
8,110,300 B2  2/2012 Niedzwiecki et al.
(Continued)

FOREIGN PATENT DOCUMENTS

EP    2 741 343 A1    6/2014
JP    6-219336 A    8/1994
(Continued)

OTHER PUBLICATIONS

European Search Report for Appl. No. 16862283.5 dated May 28, 2018.
(Continued)

*Primary Examiner* — Raymond Alejandro
(74) *Attorney, Agent, or Firm* — Birch, Stewart, Kolasch & Birch, LLP

(57) ABSTRACT

A battery pack has a base plate including one surface on which two or more battery module assemblies respectively having a plurality of battery cells arranged therein are mounted in a separated state from each other with a predetermined interval therebetween. A cover member battery is coupled at one surface of the base plate in a state that the module assemblies are incorporated therein. A reinforcement supporting member is positioned at a separation part between the battery module assemblies while supporting a mounting state of the cover member for the base plate.

20 Claims, 4 Drawing Sheets

(58) Field of Classification Search
CPC . H01M 2/043; H01M 2/0434; H01M 2220/20
See application file for complete search history.

(56) References Cited

U.S. PATENT DOCUMENTS

| | | | |
|---|---|---|---|
| 8,394,523 B2 | 3/2013 | Yeo | |
| 9,041,350 B2 | 5/2015 | Bang et al. | |
| 9,419,262 B2 | 8/2016 | Kim | |
| 2013/0252059 A1 | 9/2013 | Choi et al. | |
| 2014/0030563 A1 | 1/2014 | Hoshi et al. | |
| 2014/0284125 A1 | 9/2014 | Katayama et al. | |
| 2014/0315064 A1 | 10/2014 | Katayama et al. | |
| 2015/0207119 A1* | 7/2015 | Onodera | H01M 2/1077 429/89 |

FOREIGN PATENT DOCUMENTS

| | | |
|---|---|---|
| JP | 2012-101663 A | 5/2012 |
| JP | WO2013/073432 A1 | 5/2013 |
| JP | 2013-147137 A | 8/2013 |
| JP | 2014-139937 A | 7/2014 |
| JP | 2015-8161 A | 1/2015 |
| JP | 2015-84331 A | 4/2015 |
| KR | 10-1040875 B1 | 6/2011 |
| KR | 10-1045855 B1 | 7/2011 |
| KR | 10-2012-0005727 A | 1/2012 |
| KR | 10-2012-0123945 A | 11/2012 |
| KR | 10-1293943 B1 | 8/2013 |
| KR | 10-1439677 B1 | 9/2014 |
| WO | WO 2012/140791 A1 | 10/2012 |

OTHER PUBLICATIONS

International Search Report issued in PCT/KR2016/010250 (PCT/ISA/210), dated Dec. 20, 2016.

* cited by examiner

BATTERY PACK INCLUDING REINFORCEMENT SUPPORTING MEMBER

TECHNICAL FIELD

The present invention relates to a battery pack including a reinforcement supporting member. This application claims priority to and the benefit of Korean Patent Application No. 10-2015-0154836 filed in the Korean Intellectual Property Office on Nov. 5, 2015, the entire contents of which are incorporated herein by reference.

BACKGROUND ART

Recently, as technology development and demand for mobile devices has been increasing, the demand for rechargeable batteries capable of being charged and discharged as an energy source has been rapidly increasing, and accordingly, a great deal of research on rechargeable batteries that can meet various demands has been conducted. Also, the rechargeable batteries are attracting attention as a power source for electric vehicles (EV), hybrid electric vehicles (HEV), plug-in hybrid electric vehicles (Plug-In HEV), etc. that are presented as a solution to solve air pollution and the like of conventional gasoline vehicles and diesel vehicles using fossil fuels. Therefore, the electric vehicles (EV) that can operate only with the battery, as well as the hybrid electric vehicles (HEV) using the battery and the conventional engine, are being developed, and some are commercially available. The rechargeable battery as the power source such as for the EV, the HEV, and the like is generally a nickel metal hydrogen (Ni-MH) rechargeable battery, and recently, research on lithium secondary batteries with high energy density, high discharge voltage, and good output stability have been actively conducted, and several are in commercialization stages. When the rechargeable battery is used as the power source of the vehicle, the rechargeable battery is used in a form of a battery pack including a plurality of battery modules in battery module assemblies. In this case, to use the battery pack as the power source of a device or a system that is exposed to various environments such as the vehicle, it must be able to maintain structural stability with respect to stimuli such as external impacts depending on various environments and ensure the safety of the battery pack at varying humidity and temperature. Accordingly, several battery packs used as the power source of the vehicles are mounted in an internal space like a part of a seat area from the trunk of the vehicle to easily secure a mounting space and reduce the stimuli due to various factors such as the external impact and humidity. However, these vehicle battery packs occupy a large portion of the internal space due to their large volume, and there are problems that the trunk space may not be fully utilized and the seat of the vehicle must be reduced. Therefore, there is a high necessity of a technology capable of fundamentally solving such problems. The above information disclosed in this Background section is only for enhancement of understanding of the background of the invention and therefore it may contain information that does not form the prior art that is already known in this country to a person of ordinary skill in the art.

DISCLOSURE

Technical Problem

An object of The present invention is to solve the problems of the prior art and the technical problems of the past. The inventors of the present invention performed in-depth research and various experiments, and as a result, confirmed, as to be explained later, that structural stability of a battery pack may be improved by configuring it to include a reinforcement supporting member positioned at a separation part between battery module assemblies while supporting a mounting state of a cover member for a base plate, and accordingly, being capable of eliminating or reducing constraints on a mounting space of external devices, therein confirming an increase in utilization of an internal space of the external devices, and thereby completed the present invention.

Technical Solution

To achieve the above objects, a battery pack according to the present invention may be a structure including:

a base plate including one surface on which two or more battery module assemblies respectively having a plurality of battery cells arranged therein are mounted in a separated state from each other with a predetermined interval therebetween;

a cover member battery coupled at one surface of the base plate in a state that the module assemblies are incorporated therein; and a reinforcement supporting member positioned at a separation part between the battery module assemblies while supporting a mounting state of the cover member for the base plate. If the reinforcement supporting member is not positioned between the battery module assemblies in the structure, each of the battery module assemblies may move in relatively different directions by an external force applied to the battery pack in various driving environments, and as a result, cracks may occur at the base plate part and the cover member part between the battery module assemblies, and the entire structural stability of the battery pack may be deteriorated. Accordingly, the battery pack of the present invention may have improved structural stability by the reinforcement supporting member positioned at the separation part between the battery module assemblies between the base plate and the cover member, and by eliminating or reducing constraints on the mounting space of the external devices, they may be mounted to various parts and thereby increase the utilization of the internal space of the external devices. In a specific embodiment, each battery module assembly may be formed with a cuboid structure in which a length of one outer circumferential side is relatively larger than a length of a remaining outer circumferential side. In detail, each battery module assembly is formed as the plurality of battery cells are arranged, and in this case, the battery module assembly may be formed with the cuboid structure by using ease of an electrical connection structure formation of the battery cells, ease of application of the limited mounting space of the vehicle, etc. Also, the battery module assemblies may be in a structure in which the battery module assemblies are mounted on the base plate in a state that the outer circumferential sides having the relatively large size face each other. However, the mounting structure of the battery module assemblies is not limited thereto, and the battery module assemblies may be mounted or arranged on the base plate in various structures according to the mounting position of the battery pack and the shape of the mounting space. In addition, a mutual separation distance of the battery module assemblies has a size of 150% to 500% with respect to a width of the reinforcement supporting member. As explained above, as the reinforcement supporting member is positioned at the separation part between the battery module assemblies while supporting the mounting state of the cover member for the base plate and the mutual separation distance of the battery module assemblies is formed with a predetermined size with respect to the width of the reinforcement supporting member, a predetermined space may be formed at the part where the reinforcement supporting member is positioned.

Advantageous Effects

Accordingly, sufficient space may be provided to accommodate an electrical connection member to electrically connect the battery modules or the battery module assemblies at the separation part between the battery module assemblies as well as the reinforcement supporting member. If the mutual separation distance of the battery module assemblies has a size of less than 150% with respect to the width of the reinforcement supporting member, the space to accommodate the electrical connection members may not be sufficiently obtained, and on the other hand, in the case of the size exceeding 500% thereof, since the separation distance between the battery module assemblies is excessively large, despite the support by the reinforcement supporting member, the relative movement of the battery module assemblies may not be suppressed, and accordingly, it is difficult to obtain the structural stability of the battery pack. In a specific embodiment, in the base plate, a compartment space may have a structure in which it may be formed at a separation part between the battery module assemblies to divide a part where the battery module assemblies are mounted, and in this case, the reinforcement supporting member may have a structure in which the reinforcement supporting member may be disposed at the compartment space of the base plate. In other words, as the compartment space mutually divides the mounting parts of the battery module assemblies at the separation part between the battery module assemblies and suppresses the movement of each battery module assembly, the structural stability may be improved. In this case, the compartment space may be formed by a partition protruded with a predetermined height from the base plate to make the effect more effective. Also, the cover member may have a structure in which it is formed such that an interior circumference corresponds to an external circumferential surface of a battery module assembly group. Here, the phrase "battery module assembly group" means the battery module assemblies that are arranged in a structure mounted on the base plate. Accordingly, when the battery pack is mounted in the vehicle, it is possible to minimize the required space. In this case, the cover member may be formed with a structure in which a part corresponding to a separation space between the battery module assemblies is recessed inside to define the battery module assemblies. Accordingly, the battery module assemblies are respectively stably fixed and maintained by the cover member, and accordingly, as the movement in the battery pack is suppressed, the structural stability may be improved. Also, since the reinforcement supporting member supports the mounting state of the cover member for the base plate at the separation part between the battery module assemblies, due to the structure of the cover member in which the part corresponding to the separation space between the battery module assemblies is recessed inside, there is no need for an unnecessarily large size of the reinforcement supporting member, and accordingly, time and expense of manufacturing the reinforcement supporting member may be reduced. In addition, when the battery pack is mounted to the part such as a lower frame surface of the vehicle having an irregular shape, since the frame of the vehicle to mount and fix the battery pack may be positioned at the recessed space of the cover member, the battery pack may be mounted at the mounting part having more various exterior shapes, thereby stably fixing and maintaining the mounting state of the battery pack. In order to maximize this effect, the cover member may be, of course, the structure in which more various parts are recessed inside corresponding to the mounting part having the various exterior shapes as well as the separation space between the battery module assemblies. On the other hand, the reinforcement supporting member may be formed with a structure in which a connection beam is connected between at least two supporting parts. Accordingly, the reinforcement supporting member with a relatively lower weight and a compacted size may stably support the mounting state of the cover member for the base plate. The supporting parts and the connection beam may be formed with an integral structure to further improve the structural stability. The length of the connection beam connected between the supporting parts may be formed with a structure having a size of 10% to 30% with respect to the entire length of the reinforcement supporting member. If the length of the connection beam connected between the supporting parts is formed with a size of less than 10% with respect to the entire length of the reinforcement supporting member, the weight and/or the size may be increased compared with that required in order for the reinforcement supporting member to exert the desired supporting force. On the other hand, if the length of the connection beam connected between the supporting parts exceeds 30% with respect to the entire length of the reinforcement supporting member, the distance between the supporting parts is too far, thereby the mounting stage of the cover member for the base plate may not be stably supported. In a specific embodiment, each supporting part may be formed with a columnar shape in which a horizontal cross-sectional shape has a circular, quadrangular, triangular, or polygonal structure, and in detail, the horizontal cross-sectional shape may be formed with the columnar shape as the circular structure to uniformly disperse the external force. The reinforcement supporting member may have a structure in which both surfaces of the supporting parts facing each other are respectively joined face-to-face to the recessed part of the interior circumference of the cover member and the separation part of the battery cell assemblies on the base plate. As explained above, while supporting the mounting stage of the cover member for the base plate, the reinforcement supporting member is positioned at the separation part between the battery module assemblies, and the cover member may be formed with a structure in which the part corresponding to the separation space between the battery module assemblies is recessed inside so that the battery module assemblies are divided. Accordingly, as both surfaces of the supporting part facing each other with the columnar shape are joined face-to-face to the recessed interior circumference part of the cover member and the separation part of the battery cell assemblies on the base plate, the reinforcement supporting member may stably support the mounting state of the cover member for the base plate. In this case, the supporting part may be formed with a structure in which the supporting par is formed with a fastening hole to which a fastener is joined at both surfaces that are joined face-to-face to the cover member and the base plate. That is, the supporting part may have a structure in which the supporting part is joined to the cover member and the base plate facing both surfaces by a fastener. In detail, the fastening hole may be formed to penetrate both surfaces of the supporting part facing each other to lower the weight of the reinforcement supporting member. There may be in a structure in which a through hole is respectively formed at the parts of the cover member and the base plate corresponding to the fastening hole of the supporting part, and in which the fastener is inserted and joined through a through hole and a fastening hole in a direction from the cover member or the base plate thereto. In other words, the supporting part of the reinforcement supporting member may have a structure in which the supporting part is simultaneously joined to the cover member and the base plate by one fastener, and accordingly, the configuration of the battery pack may be further simplified. The supporting part may be formed with a structure in which the supporting part is interposed with a watertight gasket on both surfaces facing the base plate and the cover member to be joined. Accordingly, through the part where the supporting part is joined face-to-face to the base plate and the cover member, it is possible to effectively prevent the phenomenon that moisture and dirt from outside flow in. The watertight gasket may be formed with a structure such that the part corresponding to the fastening hole of the supporting part is penetrated. Accordingly, the fastener joining the base plate and the cover member, and the supporting part, may be easily engaged without interference of the watertight gasket, so it is possible to effectively prevent the phenomenon that moisture and dirt from the outside flow in through the external circumferential surface of the fastener and the interior circumference of the through hole of the base plate and the cover member. In a specific embodiment, there is no particular limitation of the material of the watertight gasket as long as it is a material that is capable of exhibiting a predetermined encapsulation force and a penetration preventing effect by being interposed between the supporting parts, and the base plate and the cover member, and in detail, the material of the watertight gasket may be at least one selected from a group including synthetic rubber, natural rubber, silicon, and polyvinyl chloride (PVC). In this case, the synthetic rubber may be at least one selected from a group including styrene-butadiene rubber, polychloroprene rubber, nitrile rubber, butyl rubber, butadiene rubber, isoprene rubber, ethylene propylene rubber, a polysulfide-based rubber, silicon rubber, a fluoride-based rubber, urethane rubber, and acryl rubber. On the other hand, the type of battery cell forming the battery pack of the present invention is not particularly limited, however, as a specific example, it may be a lithium rechargeable battery such as a lithium ion (Li-ion) rechargeable battery, a lithium polymer (Li-polymer) rechargeable battery, or a lithium ion polymer (Li-ion polymer) rechargeable battery, having merits such as high energy density, discharge voltage, and output stability. Generally, the lithium rechargeable battery is composed of a positive electrode, a negative electrode, a separator, and a lithium salt-containing non-aqueous solution. The positive electrode is manufactured, for example, by coating a mixture of a positive active material, a conductive material, and a binder on a positive electrode current collector, and then drying it, and if necessary, a filler may be further added to the mixture. The positive active material may include layered compounds or compounds substituted with one or more transition metals such as lithium cobalt oxide ($LiCoO_2$) and lithium nickel oxide ($LiNiO_2$); lithium manganese oxides of the chemical formulae of $Li_{(1+x)}Mn_{(2-x)}O_4$ (wherein x is 0-0.33), $LiMnO_3$, $LiMn_2O_3$, $LiMnO_2$, and the like; lithium copper oxide ($Li_2CuO_2$); vanadium oxides such as $LiV_3O_8$, $LiFe_3O_4$, $V_2O_5$, and $Cu_2V_2O_7$; Ni-site type lithium nickel oxides represented by the chemical formula $LiNi_{(1-x)}M_xO_2$ (wherein M=Co, Mn, Al, Cu, Fe, Mg, B, or Ga, and x=0.01-0.3); lithium manganese composite oxides represented by the chemical formula of $LiMn_{(2-x)}M_xO_2$ (wherein M=Co, Ni, Fe, Cr, Zn, or Ta, and x=0.01-0.1) or $Li_2Mn_3MO_8$ (wherein M=Fe, Co, Ni, Cu, or Zn); $LiMn_2O_4$ in which some of Li of the chemical formula is substituted with an alkaline-earth metal ion; disulfide compounds; $Fe_2(MoO_4)_3$, and the like, but is not limited thereto. The conductive material is added at 1 to 30% by weight, based on the total weight of the mixture including the positive active material. This conductive material is not particularly limited as long as it does not cause chemical changes in the battery, and has conductivity, and for example, graphite such as natural graphite or artificial graphite; carbon blacks such as carbon black, acetylene black, ketjen black, channel black, furnace black, lamp black, and summer black; conductive fiber such as carbon fiber or metal fiber; metal powder such as carbon fluoride, aluminum, and nickel powder; conductive whiskers such as zinc oxide and potassium titanate; conductive metal oxides such as titanium oxide; conductive materials such as a polyphenylene derivative; and the like may be used. The binder is a component assisting in binding the active material and the conductive material and the like, and binding for the current collector, and is generally added at 1 to 30% by weight, based on the total weight of the mixture including the positive active material. The example of this binder may include polyfluorovinylidene, polyvinyl alcohol, carboxymethyl cellulose (CMC), starch, hydroxypropyl cellulose, regenerated cellulose, polyvinylpyrrolidone, tetrafluoroethylene, polyethylene, polypropylene, ethylene-propylene-diene terpolymer (EPDM), sulfonated EPDM, styrene butadiene rubber, fluorine rubber, various copolymers, and the like. The filler is a component suppressing the expansion of the positive electrode, and is optionally used, and is not particularly limited as long as it does not cause chemical changes in the battery and is a fibrous material, and for example, olefin-based polymers such as polyethylene and polypropylene, or fibrous materials such as glass fiber and carbon fiber, may be used. The negative electrode is manufactured by coating the negative electrode active material on the negative electrode current collector and drying it, and if necessary, the components as described above may be optionally further included. The negative electrode active material may include, for example, carbon such as hard carbon and graphite-based carbon; metal composite oxides such as $Li_xFe_2O_3$ ($0 \le x \le 1$), $Li_xWO_2$ ($0 \le x \le 1$), and $Sn_xMe_{(1-x)}Me'_yO_z$ (Me: Mn, Fe, Pb, Ge; Me': Al, B, P, Si, groups 1, 2, and 3 elements of the periodic table, halogens; $0 \le x \le 1$; $1 \le y \le 3$, $1 \le z \le 8$), lithium metal; a lithium alloy; a silicon-based alloy; a tin-based alloy; metal oxides such as SnO, $SnO_2$, PbO, $PbO_2$, $Pb_2O_3$, $Pb_3O_4$, $Sb_2O_3$, $Sb_2O_4$, $Sb_2O_5$, GeO, $GeO_2$, $Bi_2O_3$, $Bi_2O_4$, and $Bi_2O_5$; conductive polymers such as polyacetylene; Li—Co—Ni-based materials; and the like. The separator and the separation film are interposed between the positive electrode and the negative electrode, and an insulating thin film having high ion permeability and mechanical strength is used. The separator has a pore diameter of generally 0.01-10 µm, and a thickness of 5-300 µm. As this separator, for example, olefin-based polymers such as chemical resistant and hydrophobic polypropylene; a sheet or non-woven fabric made of glass fiber or polyethylene; and the like are used. In the case that a solid electrolyte such as a polymer is used as the electrolyte, the solid electrolyte may also serve as the separation membrane. Also, as one detailed example, to improve the safety of the battery of high energy density, the separator and/or the separation film may be an organic/inorganic composite porous SRS (Safety-Reinforcing Separator). The SRS separator is manufactured by using an inorganic material particle and a binder polymer as an active layer component on a polyolefin-based separator substrate, and here, has a pore structure included in the separator substrate itself and a uniform pore structure formed by an interstitial volume between the inorganic material particles as the active layer component. When using an organic/inorganic composite porous separator, compared with a general separator, there is a merit that an increase of the battery thickness depending on swelling during a formation process may be suppressed, and in a case of using a polymer that is gelable during impregnation of a liquid electrolyte solution as the binder polymer component, the polymer may be simultaneously used as an electrolyte. Also, because the organic/inorganic composite porous separator may represent an excellent adherence characteristic by a content adjustment of the inorganic material particle and the binder polymer as the active layer component in the separator, there is a feature that the battery assembly process may be carried out easily. The inorganic material particle is not specially restricted as it is electrochemically stable. That is, the inorganic material particle used in the present invention is not specially restricted as an oxidation and/or a reduction reaction is not generated in an operation voltage range (e.g., 0-5 V based on Li/Li+) of the applied battery. Particularly, when using the inorganic material particle having an ion transmitting capacity, since it is possible to increase the ion conductivity within the electrochemical device to produce a performance improvement, it is preferable that the ion conductivity is as high as possible. Also, when the inorganic material particle has a high density, it is not only difficult to be dispersed during coating, but there is also a problem that the weight is increased during the battery manufacturing, so it is preferable that the density is as small as possible. Also, when using an inorganic material having a high dielectric constant, the inorganic material contributes to an increase of a dissociation degree of an electrolyte salt within the liquid electrolyte, for example a lithium salt, thereby the ion conductivity of the electrolyte solution may be improved. A lithium salt-containing non-aqueous electrolyte is formed of a polar organic electrolyte solution and a lithium salt. As the electrolyte solution, a non-aqueous-based liquid electrolyte solution, an organic solid electrolyte, an inorganic solid electrolyte, etc. are used. As the non-aqueous-based liquid electrolyte solution, for example, an aprotic organic solvent such as N-methyl-2-pyrrolidinone, propylene carbonate, ethylene carbonate, butylene carbonate, dimethyl carbonate, diethyl carbonate, gamma-butyrolactone, 1,2-dimethoxy ethane, tetrahydroxyfuran, 2-methyl tetrahydrofuran, dimethyl sulfoxide, 1,3-dioxolane, formamide, dimethylformamide, dioxolane, acetonitrile, nitromethane, formic acid methyl, acetic acid methyl, phosphoric acid triester, trimethoxy methane, dioxolane derivative, sulfolane, methyl sulfolane, 1,3-dimethyl-2-imidazolidinone, propylene carbonate derivative, tetrahydrofuran derivative, ether, propionic acid methyl, ethyl propionate, etc. may be used. As the organic solid electrolyte, for example, polyethylene derivatives, polyethylene oxide derivatives, polypropylene oxide derivatives, phosphate ester polymers, poly agitation lysine, polyester sulfide, polyvinyl alcohol, polyfluorovinylidene, polymers including an ionic dissociation group, and the like may be used. As the inorganic solid electrolyte, for example, nitrides, halides, sulfides, or the like of Li such as $Li_3N$, $LiI$, $Li_5NI_2$, $Li_3N$—$LiI$—$LiOH$, $LiSiO_4$, $LiSiO_4$—$LiI$—$LiOH$, $Li_2SiS_3$, $Li_4SiO_4$, $Li_4SiO_4$—$LiI$—$LiOH$, $Li_3PO_4$—$Li_2S$—$SiS_2$, etc. may be used. The lithium salt is a material which is readily soluble in the non-aqueous electrolyte, and for example, $LiCl$, $LiBr$, $LiI$, $LiClO_4$, $LiBF_4$, $LiB_{10}Cl_{10}$, $LiPF_6$, $LiCF_3SO_3$, $LiCF_3CO_2$, $LiAsF_6$, $LiSbF_6$, $LiAlCl_4$, $CH_3SO_3Li$, $CF_3SO_3Li$, $(CF_3SO_2)_2NLi$, chloroborane lithium, lower aliphatic carbonic acid lithium, 4 phenyl boric acid lithium, imide, and the like may be used. Further, to the non-aqueous electrolyte solution, for the purpose of improving charge and discharge characteristics, flame retardancy, and the like, for example, pyridine, triethylphosphite, triethanolamine, cyclic ether, ethylene diamine, n-glyme, triamide hexaphosphate, nitrobenzene derivatives, sulfur, quinoneimine dyes, N-substituted oxazolidinone, N,N-substituted imidazolidine, ethylene glycol dialkyl ether, ammonium salts, pyrrole, 2-methoxy ethanol, aluminum trichloride, and the like may be added. In some cases, for imparting incombustibility, a halogen-containing solvent such as carbon tetrachloride and ethylene trifluoride may be further included, and for improving high temperature storage characteristics, carbon dioxide gas may be further included. The present invention also provides a device including the above battery pack, and the device may be one selected from a group consisting of an electric vehicle, a hybrid electric vehicle, or a plug-in hybrid electric vehicle. The above-described devices are well-known in the art such that a detailed description thereof will be omitted in the present specification.

DETAILED DESCRIPTION OF THE EMBODIMENTS

Hereinafter, the present invention is further described with reference to the drawings according to the embodiments of the present invention, but the scope of the present invention is not limited thereto.

Figure 1:
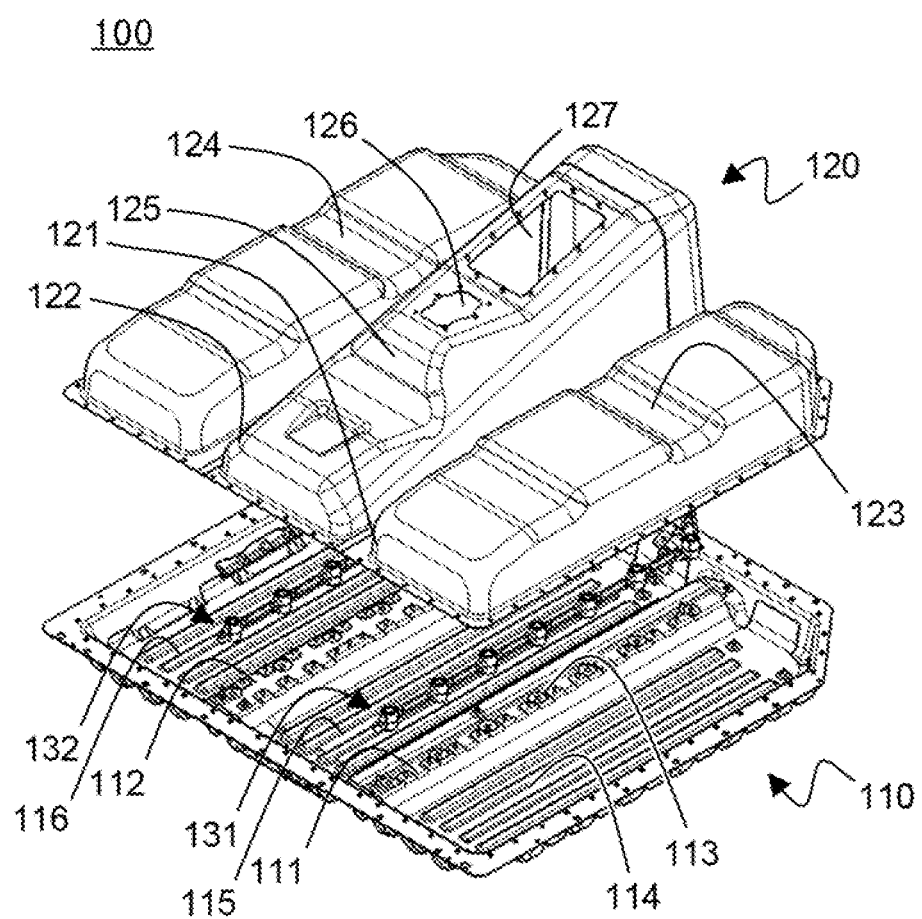
FIG. 1 is an exploded view schematically illustrating a structure of a battery pack according to an exemplary embodiment of the present invention.

FIG. 1 is an exploded view schematically illustrating a structure of a battery pack according to an exemplary embodiment of the present invention.

Referring to FIG. 1, a battery pack 100 includes a base plate 110, a cover member 120, and two reinforcement supporting members 131 and 132.

The base plate 110 is formed with a sheet-shaped structure in which an upper surface is entirely recessed in a lower surface direction so that three battery module assemblies are mounted in a separated state from each other with a predetermined interval therebetween.

At the separation part between the battery module assemblies, compartment spaces 111 and 112 in which the two reinforcement supporting members 131 and 132 may be positioned are formed with a partition structure that is protruded with a predetermined height in the cover member 120 direction from the base plate 110.

Accordingly, at the separation part between the battery module assemblies, mounting parts 114, 115, and 116 of the battery modules are mutually divided by the compartment spaces 111 and 112, and accordingly, as movement of each of the battery module assemblies mounted in the battery pack 100 is suppressed, the structural stability may be improved.

A through hole 113 is formed in the compartment spaces 111 and 112 so that a fastener may be inserted and joined to the part corresponding to the supporting part of the reinforcement supporting members 131 and 132.

The cover member 120 is formed with a structure in which parts 121 and 122 corresponding to the separation part between the battery module assemblies are recessed inside to divide each of the battery module assemblies as a structure in which an interior circumference corresponds to an external circumferential surface of the battery module assembly group.

The cover member 120 includes parts 123 and 124 that are additionally further recessed at the part corresponding to the upper surface of the battery module assemblies positioned at both sides by corresponding to the mounting part of an external device having various exterior shapes as well as the parts 121 and 122 corresponding to the separation part between the battery module assemblies.

Accordingly, the battery pack 100 may be stably mounted and fixed to the part having the various shapes such as a frame lower surface of the vehicle.

The cover member 120 includes an inclination part 125 formed with a structure corresponding to the mounting part of the battery pack 100 of the external device at the part covering the upper surface of the battery module assembly positioned at the center.

Accordingly, the inclination part 125 of the cover member 120 as the structure corresponding to the mounting part of the battery pack 100 of the external device may configure the exterior of the battery pack and simultaneously provide a space on which an electric connection device and safety apparatuses such as a BMS may be mounted at the upper surface of the battery module assembly.

Holes 126 and 127 are formed at the part corresponding to the electric connection device and the safety apparatuses that are mounted at the upper surface of the battery module assembly in the inclination part 125 of the cover member 120.

Accordingly, during repair or inspection of the electric connection device and the safety apparatuses, even if the battery pack 100 is not completely dismantled, the repair or inspection may be carried out more easily through the holes 126 and 127 formed in the inclination part 125 of the cover member 120.

Two reinforcement supporting members 131 and 132 are respectively positioned at the compartment spaces 111 and 112 of the base plate 110 formed at the separation part between the battery module assemblies and are joined face-to-face to the base plate 110 and the cover member 120, thereby stably supporting the mounting state of the cover member 120 for the base plate 110.

Figure 2:
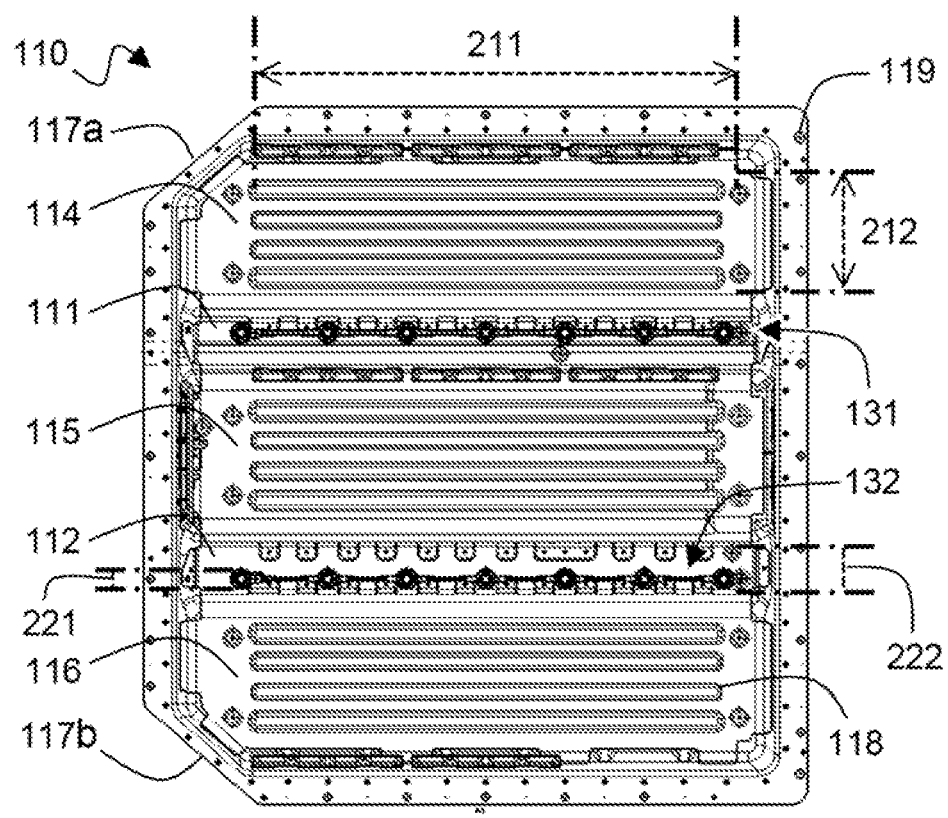
FIG. 2 is a top plan view schematically illustrating a structure of a base plate to which the reinforcement supporting member of FIG. 1 is mounted.

FIG. 2 is a top plan view schematically illustrating a structure of a base plate to which the reinforcement supporting member of FIG. 1 is mounted.

Referring to FIG. 2, three battery module assembly mounting parts 114, 115, and 116 are formed at the upper surface of the base plate 110, and the compartment spaces 111 and 112 where the reinforcement supporting members 131 and 132 are positioned to be mounted are formed at each separation part between the battery module assembly mounting parts 114, 115, and 116.

The battery module assembly mounting parts 114, 115, and 116 are formed with a structure in which a length 211 of the outer circumferential side of one side is relatively larger than a length 212 of the outer circumferential side of the other side so that the battery module assembly formed with a cuboid structure is mounted.

A plurality of reinforcing beams 118 protruded to be convex in a battery module assembly mounting direction are formed in the battery module assembly mounting parts 114, 115, and 116 in order to reinforce rigidity.

A width 222 of the compartment spaces 111 and 112 is made with a size of about 200% with respect to a width 221 of the reinforcement supporting members 131 and 132.

Accordingly, the electrical connection members to electrically connect the battery modules or the battery module assemblies may be easily accommodated at the compartment spaces 111 and 112 between the battery module assembly mounting parts 114, 115, and 116 as well as the reinforcement supporting members 131 and 132.

A plurality of fastening holes 119 for mounting to the external device are formed at the outer circumferential side of the base plate 110, and inclination parts 117a and 117b are formed corresponding to the battery pack mounting part shape of the external device at two corner parts.

Figure 3:
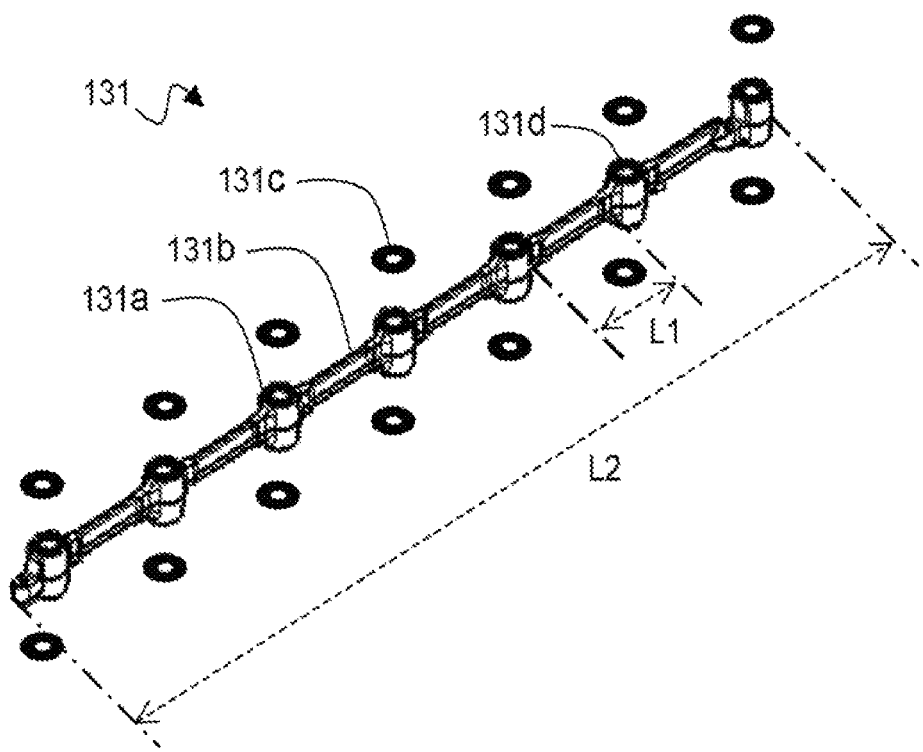
FIG. 3 is a view schematically illustrating a structure of the reinforcement supporting member of FIG. 1.

FIG. 3 is a view schematically illustrating a structure of the reinforcement supporting member of FIG. 1.

Referring to FIG. 3, the reinforcement supporting member 131 has a structure in which a connection beam 131b is continuously connected between supporting parts 131a, and the supporting parts 131a and the connection beam 131b are made with an integral structure.

The supporting parts 131a are formed with a cylindrical structure in which both surfaces facing each other are respectively joined face-to-face to the recessed interior circumference part of the cover member and the compartment space between the battery cell assemblies on the base plate.

A fastening hole 131d is formed as a penetration structure to which the fastener is joined at both surfaces of the supporting parts 131a, which are joined face-to-face to the cover member and the base plate.

A watertight gasket 131c is positioned between the cover member and the base plate at both surfaces of the supporting part 131a.

The watertight gasket 131c is formed with the same circular shape as a horizontal cross-sectional shape of the supporting parts 131a, and is formed with a structure in which a part corresponding to the fastening hole 131d of the supporting parts 131a is penetrated.

A length L1 of the connection beam 131b connected between the supporting parts 131a is formed with a size of about 10% with respect to the entire length L2 of the reinforcement supporting member 131.

Figure 4:
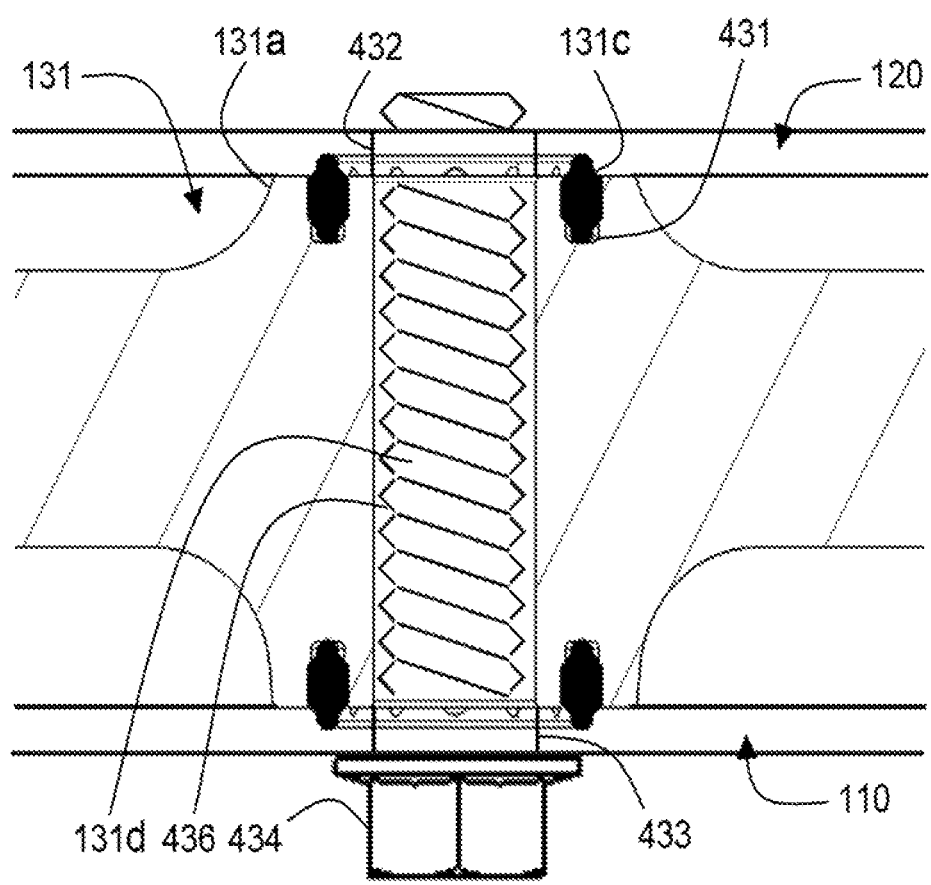
FIG. 4 is a vertical cross-sectional view schematically illustrating a side structure of the battery pack of FIG. 1.

FIG. 4 is a vertical cross-sectional view schematically illustrating a side structure of the battery pack of FIG. 1.

Referring to FIG. 4, a gasket mounting groove 431 to which the watertight gasket 131c is mounted is continuously formed around the fastening hole of the supporting parts 131a at both surfaces of the supporting parts 131a of the reinforcement supporting member 131 facing the cover member 120 and the base plate 110.

The watertight gasket 131c is protruded in a predetermined height from both surfaces of the supporting part 131a in the state that the watertight gasket 131c is mounted to the gasket mounting groove 431 and exerts a predetermined elastic force, thereby exerting a desired encapsulation force between the cover member 120 and the base plate 110.

The fastening hole 131d of the supporting part 131a of the reinforcement supporting member 131 is the penetration structure, and a groove 436 of a screw structure is formed.

Through holes 432 and 433 are respectively formed at the parts of the cover member 120 and the base plate 110 corresponding to the fastening hole 131d of the supporting parts 131a of the reinforcement supporting member 131.

Accordingly, one fastener 434 is inserted and joined with the screw structure through the through holes 432 and 433 and the fastening hole 131d in the direction to the cover member 120 from the base plate 110, and accordingly, the base plate 110, the reinforcement supporting member 131, and the cover member 120 may be stably joined and maintained.

Those of ordinary skill in the art to which the present invention belongs will be able to make various applications and modifications within the scope of the present invention.

INDUSTRIAL APPLICABILITY

As described above, as the battery pack according to the present invention is configured to include the reinforcement supporting member positioned at the separation part between the battery module assemblies while supporting the mounting state of the cover member for the base plate, the structural stability of the battery pack may be improved, and accordingly, eliminating or reducing constraints on the mounting space of the external devices therein, thus being mounted to various parts and increasing the utilization of the internal space of the external devices.

The invention claimed is:

1. A battery pack comprising:
a base plate including one surface on which two or more battery module assemblies respectively having a plurality of battery cells arranged therein are mounted in a separated state from each other with a predetermined interval therebetween, the base plate having a plurality of mounting parts for supporting the two or more battery module assemblies and at least one compartment space extending across a width of the base plate and between the plurality of mounting parts;
a cover member battery coupled at one surface of the base plate to enclose the battery module assemblies, the cover member having a plurality of recesses for covering the two or more battery module assemblies and at least one separation part extending across a width of the cover member and between the plurality of recesses; and
a reinforcement supporting member extending between the at least one compartment space and the at least one separation part between the battery module assemblies to secure the cover member to the base plate.

2. The battery pack of claim 1, wherein each battery module assembly is formed with a cuboid structure in which a length of a first side is larger than a length of a second side.

3. The battery pack of claim 2, wherein the battery module assemblies are mounted on the base plate so that the first sides of the battery module assemblies face each other.

4. The battery pack of claim 1, wherein a mutual separation distance of the battery module assemblies has a size of 150% to 500% with respect to a width of the reinforcement supporting member.

5. The battery pack of claim 1, wherein, in the base plate, the at least one compartment space is formed at the at least one separation part between the battery module assemblies to divide a part where the battery module assemblies are mounted.

6. The battery pack of claim 5, wherein the reinforcement supporting member is disposed at the at least one compartment space of the base plate.

7. The battery pack of claim 1, wherein the cover member is formed with a structure in which an interior circumference corresponds to an external circumferential surface of a battery module assembly group.

8. The battery pack of claim 7, wherein the cover member is formed with a structure in which a part corresponding to the at least one separation part between the battery module assemblies is recessed inside to define the battery module assemblies.

9. The battery pack of claim 1, wherein the reinforcement supporting member is formed with a structure in which a connection beam is connected between at least two supporting parts.

10. The battery pack of claim 9, wherein the supporting parts and the connection beam are formed with an integral structure.

11. The battery pack of claim 9, wherein the length of the connection beam connected between the supporting parts has a size of 10% to 30% with respect to the entire length of the reinforcement supporting member.

12. The battery pack of claim 9, wherein each supporting part is formed with a columnar shape in which a horizontal cross-sectional shape is a circular, quadrangular, triangular, or polygonal structure.

13. A device comprising the battery pack of claim 1.

14. A battery pack comprising:
a base plate including one surface on which two or more battery module assemblies respectively having a plurality of battery cells arranged therein are mounted in a separated state from each other with a predetermined interval therebetween;
a cover member battery coupled at one surface of the base plate in a state that the module assemblies are incorporated therein; and
a reinforcement supporting member positioned at a separation part between the battery module assemblies while supporting a mounting state of the cover member for the base plate,
wherein, in the reinforcement supporting member, both surfaces of the supporting parts facing each other are respectively joined face-to-face to a recessed part of an interior circumference of the cover member and the separation part of the battery module assemblies on the base plate.

15. The battery pack of claim 14, wherein the supporting part is formed with a fastening hole to which a fastener is joined at both surfaces that are joined face-to-face to the cover member and the base plate.

16. The battery pack of claim 15, wherein the fastening hole is formed with a structure penetrating both surfaces of the supporting part facing each other.

17. The battery pack of claim 15, wherein a through hole is respectively formed at the parts of the cover member and the base plate corresponding to the fastening hole of the supporting part, and the fastener is inserted and joined through a through hole and a fastening hole in a direction from the cover member or the base plate thereto.

18. The battery pack of claim 14, wherein the supporting part is interposed with a watertight gasket on both surfaces facing the base plate and the cover member to be joined.

19. The battery pack of claim 18, wherein the watertight gasket is formed with a structure such that the part corresponding to the fastening hole of the supporting part is penetrated.

20. The battery pack of claim 18, wherein the material of the watertight gasket is at least one selected from a group including a synthetic rubber, a natural rubber, a silicone resin, and polyvinyl chloride.

\* \* \* \* \*